Patented June 19, 1923.

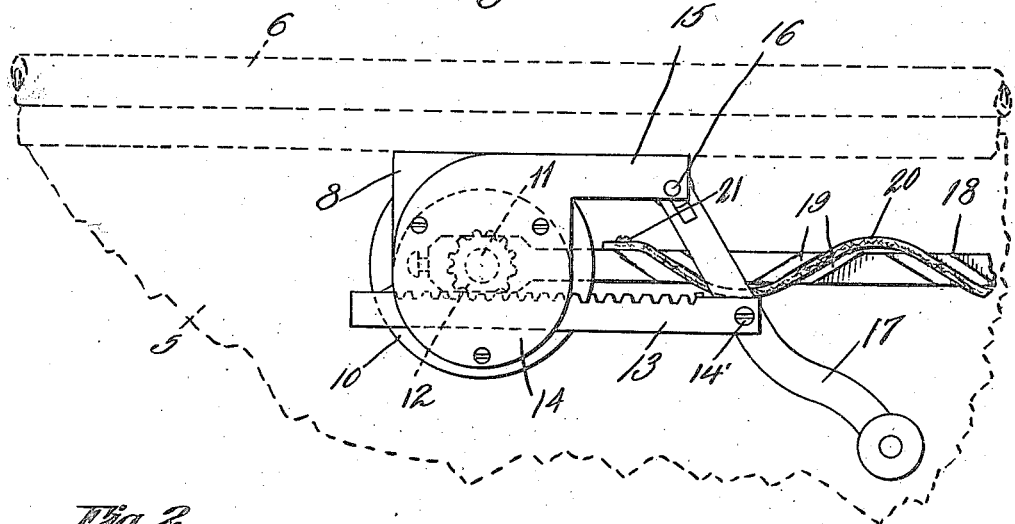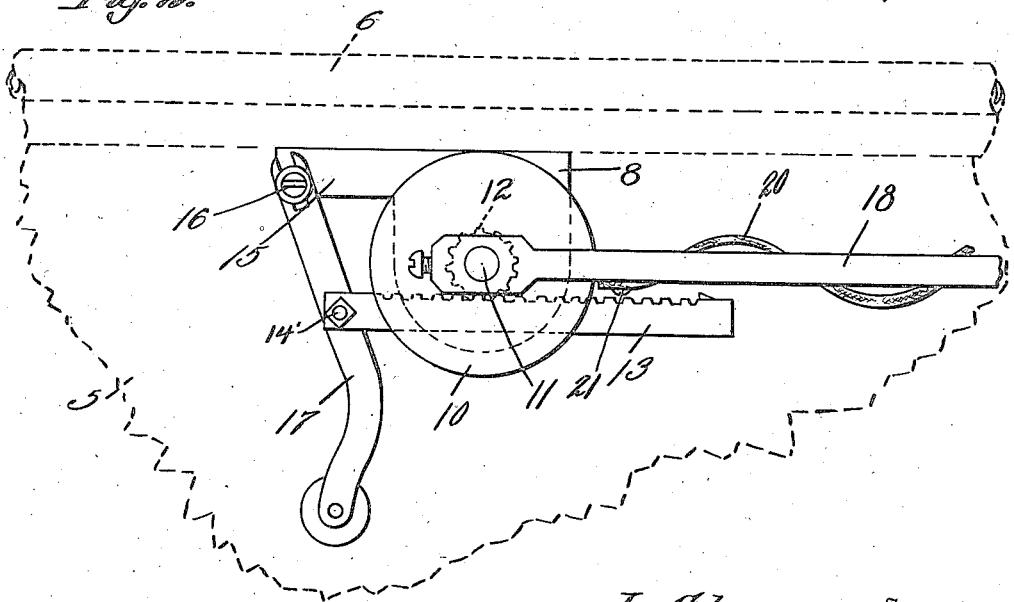

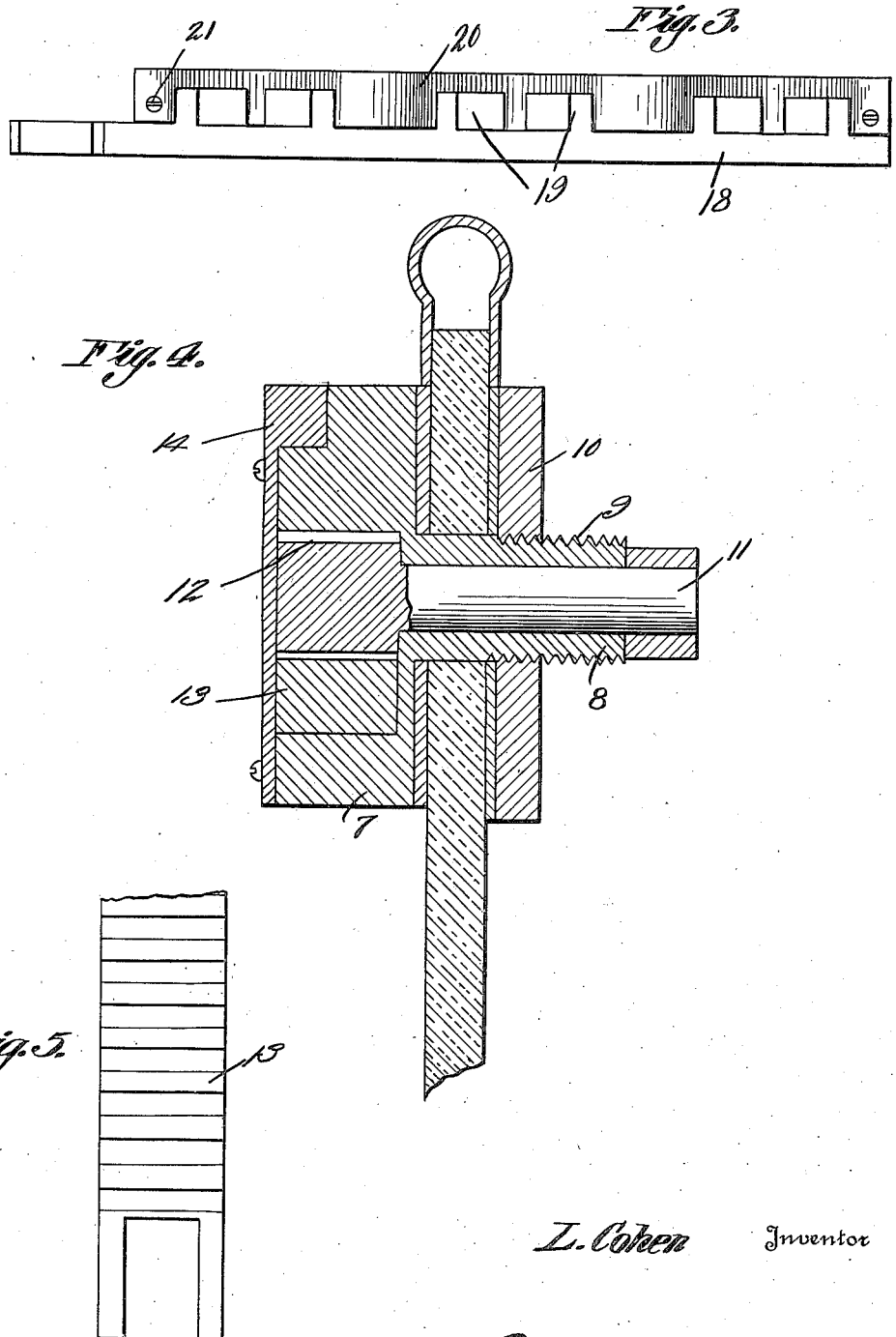

1,459,614

UNITED STATES PATENT OFFICE.

LOUIS COHEN, OF JOHNSTOWN, NEW YORK.

WINDSHIELD CLEANER.

Application filed September 24, 1921. Serial No. 502,942.

*To all whom it may concern:*

Be it known that I, LOUIS COHEN, a citizen of the United States, residing at Johnstown, in the county of Fulton and State of New York, have invented a new and useful Windshield Cleaner, of which the following is a specification.

This invention relates to windshield wipers, the object of the invention being to provide means to remove moisture or other foreign matter from a windshield to insure a clear line of vision through the windshield.

An object of the invention is to provide means for operating the wiper from a point laterally of the line of vision through the windshield, thereby eliminating the necessity of the operator swinging his arm across his line of vision, to accomplish the wiping of the windshield.

A still further object of the invention is the provision of novel means for securing the windshield engaging element to its supporting arm, to cause a uniform pressure of the windshield engaging the element on the windshield at all times.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a front elevational view of a windshield wiper constructed in accordance with the present invention, and showing the same as applied to a windshield.

Figure 2 is a rear elevational view of the same.

Figure 3 is an elevational view of the wiping arm.

Figure 4 is a sectional view through a windshield disclosing the manner of securing the wiper thereto.

Figure 5 is an enlarged detail view of the rack which transmits motion to the operating pinion.

Referring to the drawings in detail, the reference character 5 designates a windshield, which is provided with the usual frame 6, it being understood however that the upper portion of a windshield is shown to illustrate the manner of securing the wiper thereto.

The wiper embodies a gear casing 7 which is provided with an extension 8 designed to engage under one edge of the frame 6, so that when the device is operated, lateral or twisting movement of the gear casing will be prevented. Forming a part of the gear casing 7 is a hollow shaft 8 which is provided with a threaded portion 9 to accommodate the nut 10 which clamps against one surface of the windshield to secure the device thereto, it being understood however that a suitable opening is formed in the windshield to receive the hollow shaft 8.

Extending through the hollow shaft 8 is a shaft 11 which carries a pinion 12 on one end thereof, the pinion being supported within the casing 7. Associated with the pinion 12 is a rack 13 which is in mesh with the teeth of the pinion 12 so that movement of the rack will result in a rotary movement of the pinion 12 to accomplish the rotation of its shaft 11.

A cover 14 is secured to the casing 7 and as shown this cover has a laterally extending arm 15 which carries a pin 16 that accommodates the forked end of the operating arm 17, which has pivotal connection with the rack 13, at a point substantially intermediate the ends of the operating arm 17, the connection being made by means of the pin 14'.

Secured to the outer end of the shaft 11 is a wiping arm 18 which has pairs of spaced lugs 19 secured to one surface thereof, the pairs of lugs being arranged in staggered relation and designed to accommodate the wiping element 20, between the lugs of each pair. This wiping element 20 has its ends secured to the arm as at 21, and due to the construction of the lugs, the wiping element 20 presents an irregular surface which contacts with the windshield, to which the device is applied.

From the foregoing it will be seen that due to the construction of the device, the arm 18 may be swung in an arc of a circle by a slight movement of the operating arm 17, it being unnecessary for the operator to move his hand across his line of vision to accomplish the operation of the device.

Having thus described the invention, what is claimed as new is:—

A windshield wiper including a gear casing a cover on the gear casing and having an integral laterally extending arm, a hollow exteriorly threaded extension integral with the gear casing and forming a bearing for a shaft, said hollow extension adapted to extend through an opening in a wind shield, a shaft extending through the hollow extension and carrying a pinion on one end thereof, a wiping arm secured to the opposite end of the shaft, a rack bar slidably supported within the gear casing and adapted to move laterally thereof, said rack bar being in mesh with the pinion, an operating arm having one end thereof pivotally and slidably connected to the arm formed integral with the cover, said arm having pivotal connection with the rack bar, and a wiping element supported by the wiping arm.

In testimony that I claim the foregoing as my own, I have hereto affixed my signature in the presence of two witnesses.

LOUIS COHEN.

Witnesses:
 ALFRED D. DENNISON,
 JULIA F. VAN SICKLER.